April 9, 1946. S. R. SMITH, JR Re. 22,744

ELECTRIC CIRCUIT BREAKER

Original Filed Sept. 26, 1942

Inventor:
Sidney R. Smith Jr.,
by Harry E. Dunham
His Attorney.

Reissued Apr. 9, 1946 Re. 22,744

UNITED STATES PATENT OFFICE 22,744

ELECTRIC CIRCUIT BREAKER

Sidney R. Smith, Jr., Pittsfield, Mass., assignor to General Electric Company, a corporation of New York Original No. 2,357,853, dated September 12, 1944, Serial No. 459,791, September 26, 1942. Application for reissue December 1, 1944, Serial No. 566,231

24 Claims. (Cl. 200—116)

My invention relates to electric circuit breakers and more particularly to such circuit breakers which are adapted for use in place of the conventional fuse cutout devices. Specifically, my invention is an improvement on my prior copending application Serial No. 334,629, filed May 11, 1940, and assigned to the same assignee as the present application.

Fuse cutout devices have been used to a large extent in the protection of high tension electric circuits. Devices of this kind in general comprise replaceable fusible means mounted within a suitable holder and they are usually located in close proximity to the high tension conductors as a consequence of which they are relatively inaccessible for inspection and maintenance. Difficulties have been encountered in providing fuse cutouts having an electric fuse convenient for installation and inspection and at the same time capable of being removable and replaceable. In any event, an abnormal electrical condition occurring on a circuit protected by a fuse cutout will destroy the fuse and hence require replacement thereof. Although recent experimentation and research have reduced the cost of the replaceable elements, nevertheless such cost is still appreciable and it would be desirable to provide a fuseless cutout which would automatically interrupt the circuit under abnormal electrical conditions and yet wherein it is unnecessary to replace any elements after the protective operation of such cutouts, as is necessary with the fuse cutouts of the prior art.

It is an object of my invention, therefore, to provide a new and improved circuit breaker adapted to replace the fuse cutouts of the prior art.

It is another object of my invention to provide a new and improved fuseless cutout which is simple and compact, economical in construction, which gives an immediate and reliable indication of the actuation and condition thereof, and which may be used in connection with prior art housings for fuse cutouts.

Further objects and advantages of my invention will become apparent as the following description proceeds, and the features of novelty which characterize my invention will be pointed out with particularity in the claims annexed to and forming a part of this specification.

Figure 1:
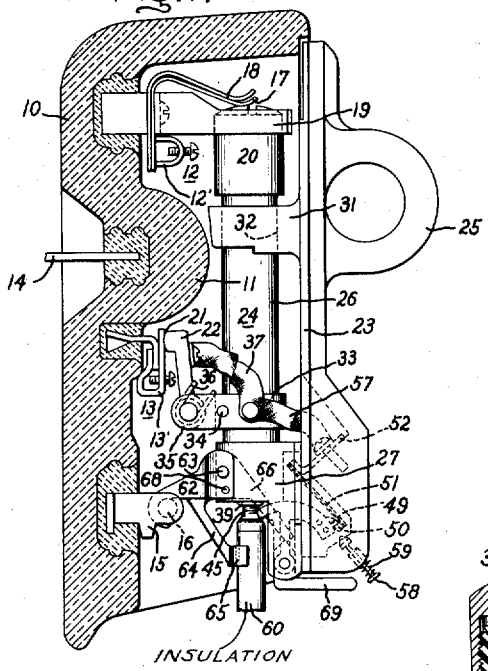
Figure 2:
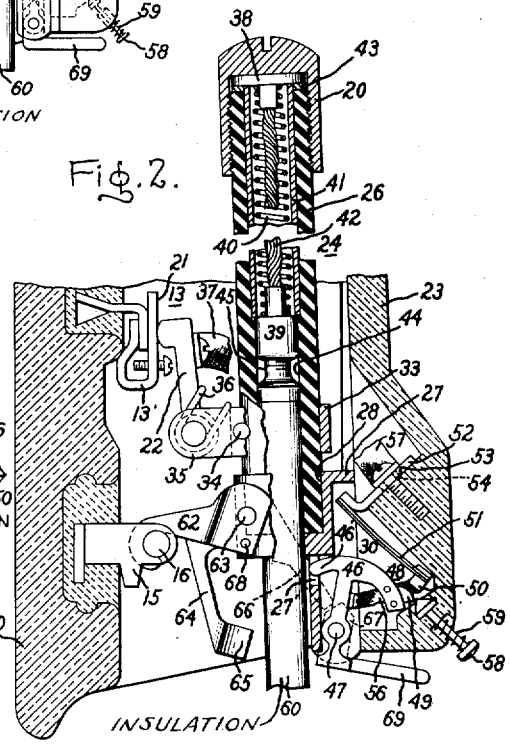
Figure 3:
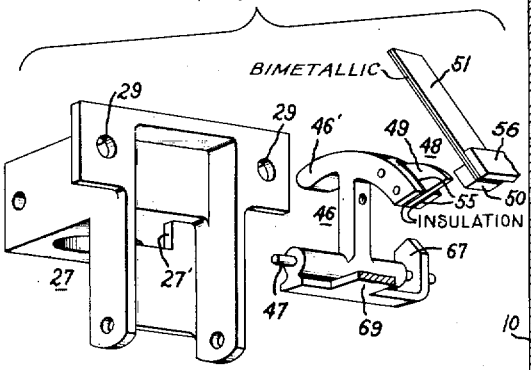

For a better understanding of my invention, reference may be had to the accompanying drawing in which Fig. 1 is a side view, partly in section of my fuseless cutout in the normal operative position with the contacts in the current carrying position, Fig. 2 is a partial view similar to Fig. 1 showing the device after the circuit has been interrupted, and Fig. 3 is an exploded view of a portion of the fuseless cutout of my invention.

Referring now to the drawing, I have illustrated my invention in connection with an insulating support or housing 10 of porcelain or similar insulating material, of the size and shape used in connection with the fuse cutouts of the prior art, such as is disclosed, for example, in United States Letters Patent 2,081,813, granted May 25, 1937, upon an application of B. R. Hermann and assigned to the same assignee as the present application. Housing 10 is preferably provided with an integrally formed electric creepage and gas barrier 11, disposed between stationary contact assemblies generally indicated at 12 and 13 supported in spaced relationship in housing 10. To the rear of the housing 10 is secured a mounting bar 14 for the attachment of the casing to an electric line pole and cross-arm structure or the like. A hinge bracket 15 is suitably secured to the inner rear wall of housing 10 in the same manner as are the contact assemblies 12 and 13; preferably these members are cemented in the recesses in the rear wall of the housing as shown in the drawing. Bracket 15 includes a pivot pin 16 by means of which a circuit breaker to be described hereinafter is pivotally supported therefrom.

Contact assemblies 12 and 13 include line terminals 12′ and 13′ respectively which are adapted to have line conductors or leads fastened thereto by means of suitable clamping screws or the like. The upper contact assembly 12 comprises a contact finger 17 backed up by means of a spring strip 18 which serves to press the finger 17 downwardly. The upper contact assembly also includes a terminal clip 19 which is arranged to receive the terminal cap 20 of my improved circuit breaker, which is similar to the terminal caps of the fuse holders of the prior art. The lower contact assembly 13 also includes a contacting surface 21 which is adapted to be engaged by a pivotally mounted contact finger 22 similar to the pivoted contact members of prior art construction. In other words the housing 10 described thus far is adapted to serve as the housing for the fuse cutouts of the prior art as well as the housing for my new and improved fuseless cutout so that prior art constructions employing fuse cutout devices may be readily converted to fuseless cutout installations, still retaining the same housing in either case.

The open side at the front of housing 10 is closed by means of a door or cover 23 preferably constructed of insulating material. This door 23 supports an electric circuit breaker generally indicated at 24 to be described in greater detail hereinafter. On the outer face of the door or cover 23, there is formed an eyelet handle 25 which may be either grasped manually or engaged by a suitable switch stick not shown. The circuit breaker 24 when in the closed position completes the circuit between the contact assemblies 12 and 13 respectively.

Door, or cover 23, which as will be described supports circuit breaker 24 is adapted to be pivotally supported by hinge member 15 in such a manner that the door and associated circuit breaker may be bodily removed from casing 10 whereupon the contact assemblies 12 and 13 are completely isolated from one another.

Door mounted circuit breaker 24 preferably comprises a tubular casing 26 of insulating material such as fiber or the like, which when subjected to the heat of an electric arc evolves an arc-extinguishing gas. Tubular casing 26 is suitably supported in a casting 27 having a casing-supporting opening 28 therein. Casting 27 is suitably bolted to door 23 as by means of bolts or rivets passing through openings 29 best shown in Fig. 3. The casting 27 cooperates with a recess 30 in door 23 to form an enclosure within which certain parts of my electric circuit breaker generally indicated at 24, are located as will be described in greater detail hereinafter. The upper end of tubular casing 26 is preferably supported by an integral extension 31 of door 23 which is provided with an opening 32 therein through which tubular casing 26 is adapted to pass. One end of tubular casing 26 is closed by terminal cap 20 as was described above, which is threadedly mounted on the upper end thereof. A lower terminal 33 for tubular casing 26 is fastened thereto as by any suitable means such as pin 34 and comprises an extension 35 for pivotally supporting contact finger 22 which is biased as by spring means 36 in a direction to engage the contact surface 21 of the lower contact assembly 13. In order to insure good electrical connection between pivotally mounted contact finger 22 and the lower contact terminal 33 of tubular casing 26, I interconnect these members by means of a flexible shunt 37.

Mounted within tubular casing 26 is a retractable assembly shown in Fig. 2 which comprises an upper terminal button 38, a lower terminal 39, a tension spring 40, a metal tube 41, and flexible shunt 42. Upper terminal button 38 is adapted to seat on the upper end of tubular casing 26 so as to be clamped in position by terminal cap 20 with which good electrical contact is made. In order to seal the upper end of tubular casing 26 a suitable gasket 43 as shown in Fig 2 may be provided. The lower terminal 39 of the retractable assembly forms the movable contact of electric circuit breaker 24 and is adapted for reciprocal movement within the bore 44 of tubular casing 26 from an extreme upper position against the lower end of metal tube 41 as shown in Fig. 2 to a position just outside the lower end of casing 26 as shown in Fig. 1. Upper terminal button 38 and movable contact 39 are electrically interconnected by flexible shunt 42. Tension spring 40 tends to draw movable contact 39 into tubular casing 26 to the position indicated in Fig. 2, the upward movement thereof being stopped by a tubular liner such as metal tube 41 whose purpose will be described hereinafter. Movable contact 39 which forms the lower terminal of the retractable assembly described above is provided with an annular groove 45 and is adapted to be electrically engaged by means of an extension 46' on a hinged contact member 46 which although slightly movable about hinge or pivot 47 supported by casting 27 in recess 30 really forms the stationary contact of my circuit breaker 24. In other words, movable contact 39 and cooperating contact 46 form the relatively movable contacts of circuit breaker 24 so that relative separation thereof is adapted to draw an arc therebetween within the bore 44 of tubular casing 26.

The annular groove 45 in movable contact 39 together with a projection 46' of hinged contact 46 which will hereinafter be referred to as stationary contact 46, provides a latching means for holding the relatively movable contacts 39 and 46 in current carrying engagement as shown in Fig. 1 against the action of the retractable assembly including tension spring 40 so long as some means is provided to hold hinged contact member 46 in the position with the extension 46' protruding through opening 27' of casting 27 to engage the annular groove 45 of movable contact 39. In order to hold hinged contact member 46 in the engaged position with movable contact 39, I provide latching means generally indicated at 48, which comprise a tooth 49 on hinged contact 46 which is adapted to engage with a catch 50 supported at the free end of a bimetallic element 51. This bimetallic element 51 is mounted in the recess 30 as by means of a bimetallic element terminal 52 which is adjustably mounted to a ledge 53 of door 23 in recess 30. The adjustable mounting comprises a slotted opening 54 in bimetallic element terminal 52 which permits adjustment of the catch 50 of the latching means 48 with relation to tooth 49 supported by hinged contact 46. In order that no current may be carried by the latching means 48 including tooth 49 and catch 50, tooth 49 is suitably insulated as indicated at 55 in Fig. 3 from hinged contact 46. A flexible shunt 56 interconnects hinged contact 46 with the free end of bimetallic element 51 to complete the electrical connection therebetween. The bimetallic element terminal 52 on the other hand is electrically interconnected with the lower terminal 33 of tubular casing 26 by means of flexible shunt 57.

Whenever the extension 46' of hinge contact 46 protrudes through opening 27' of casting 27 and is held in the annular groove 45 of movable contact 39 by latching means 48, as shown in Fig. 1, the contacts are held in current carrying engagement until release of the latching means as by flexing of bimetallic element 51 occurs. Manual release of the latching means 48 may be accomplished with the aid of a manually operable plunger or member 58 mounted in the lower part of door, or cover 23, and biased in an outward direction by spring means 59. If plunger 58 is moved inwardly, it engages the catch 50 of the latching means 48 and releases it from tooth 49.

In order to aid in the extinguishment of the arc drawn within the bore 44 of tubular casing 26 upon relative separation of contacts 39 and 46, I provide an insulating rod 60 having an outside diameter substantially equal to the diameter of movable contact 39 as best indicated in Fig. 2.

With this arrangement withdrawal of contact 39 into tubular casing 26 by the retractable assembly will also cause insulating rod 60 to be drawn into tubular casing 26 whereupon an annular bore is defined between the outer surface of insulating rod 60 and the bore 44 of tubular casing 26. This annular bore provides an arc space for the arc drawn upon relative separation of contacts 39 and 46. Insulating rod 60 is preferably formed of a gas-evolving insulating material so that the gas evolved therefrom aids in the rapid extinguishment of the arc drawn upon operation of circuit breaker 24. By virtue of the annular arc space, more rapid cooling of the arc is provided which consequently speeds up the interrupting process and furthermore the arc is forced or confined into a relatively small space so as to engage with a large area of insulating material from which gas is evolved when subjected to the heat of an electric arc.

To support door 23 and circuit breaker 24 from pivot pin 16 of bracket 15, a suitable hook-shaped member 62 is provided which is pivotally mounted to casting 27 as indicated at 63. Hook-shaped member 62 is adapted to engage with the pin 16 of bracket 15 whereupon the door mounted circuit breaker 24 is pivotally mounted so that if terminal clip 19 is disengaged from terminal cap 20, door 23 would pivot about the pin 16 of bracket 15 to the open position. Hook 62 is provided with an extension 64 including a guide member 65 which engages with insulating rod 60 to guide it in its movement into tubular casing 26 during the circuit interrupting operation. Hook 62 is also provided with another extension 66 which engages with a tooth 67 on hinged contact 46 so as to prevent pivotal movement of hook 62 relative to bracket 27 about pivot 63 when contacts 39 and 46 are in current carrying engagement. In other words the circuit must be broken between relatively movable contacts 39 and 46 before door 23 can drop open.

As soon as extension 66 is released from engagement with tooth 67 the circuit breaker assembly is permitted to move downwardly both by virtue of gravity and the force of spring backed contact finger 17 about pivot 63 so that terminal clip 19 is released from terminal cap 20 by the downward movement of the entire door-mounted circuit breaker 24, whereupon the door drops to the open position. If it is desired to prevent the door from moving to the open position on the occurrence of a circuit-interrupting operation, a suitable screw may be inserted in opening 68 of hook 62 to engage with casting 27 thereby preventing pivotal movement about pivot 63.

In the collapsed position of the retractable assembly as was mentioned above, movable contact 39 engages with the end of metal tube 41. The purpose of this is to prevent the high gas pressures formed within the bore 44, of tubular casing 26 upon a circuit interrupting operation, from acting on the upper surface of movable contact 39 to force the contact back to the closed circuit position.

In order to aid in resetting the circuit breaker 24 hinged contact 46 is provided with a manual lever 69 which extends out of the enclosure formed between casting 27 and the door 23.

With the door mounted circuit breaker 24 in the position indicated in Fig. 2, reclosing of the circuit through the fuseless cutout is accomplished by first removing the door 23 and circuit breaker 24 mounted thereon from housing 10. Next the insulating rod 60 which should preferably be formed at the lower end thereof so as to provide a suitable grip for resetting, is grasped and pulled downwardly at the same time that manual lever 69 of hinged contact 46 is moved upwardly so that extension 46' thereof may protrude through opening 27' of casting 27 to make contact with movable contact 39 by engaging the annular groove 45 formed therein. The upward movement of manual lever 69 of hinged contact 46 will cause tooth 49 to engage with catch 50 of bimetallic thermal element 51. Flexing of bimetallic thermal element 51, either due to an abnormal current flowing therethrough or manually by operating plunger 58 will cause release of latching means 48 and consequent interruption of the circuit within the annular bore formed between insulating rod 60 and the interior surface of tubular casing 26. The interrupting operation is always performed between relatively movable contacts 39 and 46 so that when the door 23 moves to the open position, taking with it door mounted circuit breaker 24, an isolating action between the contact assemblies including terminal assemblies 12 and 13 is provided. The position of insulating rod 60 with or without the opening of door 23 gives a clear visual indication of whether the fuseless cutout of my invention has operated and requires resetting. Also the open cover or door 23, when dropped out, gives indication of operation.

The operation of the fuseless cutout of my invention will be obvious from the detailed description included above and no further description will be made. As will be evident from the foregoing description the present invention provides pronounced advantages over fuse cutouts of the prior art in that it is unnecessary to replace any parts before the circuit may again be completed after circuit interruption, it being merely necessary for the lineman to reclose the circuit breaker in the manner described above. Also, an indication of the condition of the fuseless cutout is at all times evident to the lineman.

Furthermore, a suitable arc interrupting means for efficiently interrupting the relatively high voltages found on distribution circuits is incorporated in the device.

While I have shown and described a particular embodiment of my invention for a fuseless cutout, I do not desire my invention to be limited to the construction shown and described, for it will, of course, be obvious that changes and modifications may be made without departing from my invention and I therefore aim in the appended claims to cover all such changes and modifications as fall within the true spirit and scope of my invention.

What I claim as new and desire to secure by Letters Patent of the United States is:

1. In an electric switching device, the combination of a housing and a cover for closing an open side of said housing, a circuit interrupter mounted on said cover comprising a pair of relatively movable contacts, a recess in said cover, and bimetallic means mounted in said recess for initiating relative separation of said contacts to interrupt the circuit associated with said device, said circuit interrupter being so constructed and arranged that said contacts may be reclosed to reestablish an electric circuit therethrough.

2. In an electric switching device, the combination of a housing and a cover for closing an open side of said housing, a circuit interrupter mounted on said cover comprising a pair of relatively movable contacts, a recess in said cover, means for causing relative separation of said contacts, and latching means including bimetallic means mounted in said recess for rendering said first mentioned means ineffective, said bimetallic means being arranged upon predetermined current conditions to permit said first mentioned means to cause relative separation of said contacts to interrupt the circuit associated with said device, said circuit interrupter being so constructed and arranged that said contacts may be reclosed to reestablish an electric circuit therethrough.

3. In an electric switching device, the combination of a housing and a cover for closing an open side of said housing, a circuit interrupter mounted on said cover comprising a tubular casing, a pair of relatively movable contacts, one of which is mounted in said casing, a recess in said cover, and bimetallic means mounted in said recess for initiating relative separation of said contacts to interrupt the circuit associated with said device, said circuit interrupter being so constructed and arranged that said contacts may be reclosed to reestablish an electric circuit therethrough.

4. In an electric switching device, the combination of a housing and a door for closing an open side of said housing, a circuit interrupter mounted on said door comprising a tubular casing, a pair of relatively movable contacts, one of which is mounted in said casing, means for defining an annular arc space in said casing so that the arc drawn upon relative separation of said contacts is confined in said annular arc space for rapid extinguishment thereof, a recess in said door, and bimetallic means mounted in said recess for initiating relative separation of said contacts to interrupt the circuit associated with said device, said circuit interrupter being so constructed and arranged that said contacts may be reclosed to reestablish an electric circuit therethrough.

5. In an electric switching device, the combination of a housing and a door for closing an open side of said housing, a circuit interrupter mounted on said door comprising a tubular casing, a pair of relatively movable contacts comprising a movable contact mounted in said casing and a cooperating contact member located outside said casing and adapted to be in current carrying engagement with said movable contact when said movable contact is moved out of said casing, a retractable contact assembly in said casing for causing withdrawal of said movable contact into said casing and relative separation of said contacts, a rod of arc extinguishing material connected to said movable contact so as to be drawn into said casing to define an annular arc space therein upon relative separation of said contacts, latching means for holding said contacts in current carrying engagement against the force of said retractable assembly, a recess in said door, and bimetallic means mounted in said recess for initiating relative separation of said contacts to interrut the circuit associated with said device by causing release of said latching means, said circuit interrupter being so constructed and arranged that said contacts may be reclosed to reestablish an electric circuit therethrough.

6. In an electric switching device, the combination of a housing and a cover for closing an open side of said housing, a circuit interrupter mounted on said cover comprising a pair of relatively movable contacts, a recess in said cover and means mounted in said recess for initiating relative separation of said contacts to interrupt the circuit associated with said device, said circuit interrupter being so constructed and arranged that said contacts may be reclosed to reestablish an electric circuit therethrough.

7. In an electric switching device, the combination of a housing and a cover for closing an open side of said housing, a circuit interrupter mounted on said cover comprising a pair of relatively movable contacts, a recess in said cover, means for causing relative separation of said contacts, and latching means including additional means mounted in said recess for rendering said first mentioned means ineffective, said additional means being arranged upon predetermined current conditions to permit said first mentioned means to cause relative separation of said contacts to interrupt the circuit associated with said device, said circuit interrupter being so constructed and arranged that said contacts may be reclosed to reestablish an electric circuit therethrough.

8. In an electric switching device, the combination of a housing and a cover for closing an open side of said housing, a circuit interrupter mounted on said cover comprising a tubular casing, a pair of relatively movable contacts, one of which is mounted in said casing, a recess in said cover, and means mounted in said recess for initiating relative separation of said contacts to interrupt the circuit associated with said device, said circuit interrupter being so constructed and arranged that said contacts may be reclosed to reestablish an electric circuit therethrough.

9. In an electric switching device, the combination of a housing and a door for closing an open side of said housing, a circuit interrupter mounted on said door comprising a tubular casing, a pair of relatively movable contacts, one of which is mounted in said casing, means for defining an annular arc space in said casing so that the arc drawn upon relative separation of said contacts is confined in said annular arc space for rapid extinguishment thereof, a recess in said door, and means mounted in said recess for initiating relative separation of said contacts to interrupt the circuit associated with said device, said circuit interrupter being so constructed and arranged that said contacts may be reclosed to reestablish an electric circuit therethrough.

10. In an electric switching device, the combination of a housing and a cover for closing an open side of said housing, a circuit interrupter mounted on said cover comprising a tubular casing, a pair of relatively movable contacts comprising a movable contact mounted in said casing and a cooperating contact member located outside said casing and adapted to be in current carrying engagement with said movable contact when said movable contact is moved out of said casing, a retractable contact assembly in said casing for causing withdrawal of said movable contact into said casing and relative separation of said contacts, a rod of arc-extinguishing material connected to said movable contact so as to be drawn into said casing to define an annular arc space therein upon relative separation of said contacts, latching means for holding said contacts in current carrying engagement against the force of said retactable assembly, a recess in said cover, and means mounted in said recess for initiating relative separation of said contacts to interrupt the circuit associated with said device by causing release of said latching means, said circuit interrupter being so constructed and arranged that said contacts may be reclosed to reestablish an electric circuit therethrough.

11. In an electric switching device, the combination of a housing and a recessed cover for closing an open side of said housing, a circuit interrupter mounted on said recessed cover comprising a pair of relatively movable contacts, means for causing relative separation of said contacts, and latching means including bimetallic means mounted in said recessed cover for rendering said first mentioned means ineffective, said bimetallic means being arranged upon predetermined current conditions to permit said first mentioned means to cause relative separation of said contacts to interrupt the circuit associated with said device, said circuit interrupter being so constructed and arranged that said contacts may be reclosed to reestablish an electric circuit therethrough.

12. In an electric switching means, the combination of a housing and a recessed cover for closing an open side of said housing, a circuit interrupter mounted on said recessed cover comprising a pair of relatively movable contacts, and means mounted in said recessed cover for initiating relative separation of said contacts to interrupt the circuit associated with said device, said circuit interrupter being so constructed and arranged that said contacts may be reclosed to reestablish an electric circuit therethrough.

13. In an electric switching device, the combination of an insulating support, a circuit interrupter hingedly mounted on said support comprising a tubular casing, a pair of relatively movable contacts one of which is mounted in said casing, means for defining an annular arc space in said casing so that the arc drawn upon relative separation of said contacts is confined in said annular arc space for rapid extinguishment thereof, an enclosure associated with said support, and means mounted in said enclosure for initiating relative separation of said contacts to interrupt the circuit associated with said device, said circuit interrupter being so constructed and arranged that said contacts may be reclosed to reestablish an electric circuit therethrough.

14. In an electric switching device, the combination of an insulating support, a circuit interrupter hingedly mounted on said support comprising a tubular casing, a pair of relatively movable contacts comprising a movable contact mounted in said casing and a cooperating contact member located outside said casing and adapted to be in current carrying engagement with said movable contact when said movable contact is moved out of said casing, a retractable contact assembly in said casing for causing withdrawal of said movable contact into said casing and relative separation of said contacts, a rod of arc extinguishing material connected to said movable contact so as to be drawn into said casing to define an annular arc space therein upon relative separation of said contacts, latching means for holding said contacts in current carrying engagement against the force of said retractable assembly, an enclosure associated with said support, and means mounted in said enclosure for initiating relative separation of said contacts to interrupt the circuit associated with said device by causing release of said latching means, said circuit interrupter being so constructed and arranged that said contacts may be reclosed to reestablish and electric circuit therethrough.

15. In an electric switching device, the combination of a housing and a door for closing an open side of said housing, a circuit interrupter mounted on said door comprising a tubular casing, a pair of relatively movable contacts comprising a movable contact mounted in said casing and a cooperating contact member located outside said casing and adapted to be in current carrying engagement with said movable contact when said movable contact is moved out of said casing, a retractable contact assembly in said casing for causing withdrawal of said movable contact into said casing and relative separation of said contacts, a rod of arc extinguishing material connected to said movable contact so as to be drawn into said casing to define an annular arc space therein upon relative separation of said contacts, latching means for holding said contacts in current carrying engagement against the force of said retractable assembly, and bimetallic means mounted in said housing for initiating relative separation of said contacts to interrupt the circuit associated with said device by causing release of said latching means, said circuit interrupter being so constructed and arranged that said contacts may be reclosed to reestablish an electric circuit therethrough.

16. In an electric switching device, the combination of a housing and a door for closing an open side of said housing, a circuit interrupter mounted on said door comprising a tubular casing, a pair of relatively movable contacts one of which is mounted in said casing, means for defining an annular arc space in said casing so that the arc drawn upon relative separation of said contacts is confined in said annular arc space for rapid extinguishment thereof, and bimetallic means mounted in said housing for initiating relative separation of said contacts to interrupt the circuit associated with said device, said circuit interrupter being so constructed and arranged that said contacts may be reclosed to reestablish an electric circuit therethrough.

17. In an electric switching device, the combination of an insulating support, a circuit interrupter hingedly mounted on said support comprising a tubular casing, a pair of relatively movable contacts associated with said casing, one of which is adapted for reciprocal movement in said casing, a tubular liner for a portion of said casing, means for causing relative separation of said contacts to draw an arc in said casing and to cause one of said contacts to move into said casing to engage an end of said tubular liner whereby high gas pressures produced in said tubular casing upon the drawing of an arc in said casing cannot force said one contact toward the closed circuit position.

18. In an electric switching device the combination of a housing and a recessed cover for closing an open side of said housing, a circuit interrupter mounted on said recessed cover comprising a pair of relatively movable contacts, means mounted in said recessed cover for initiating relative separation of said contacts to interrupt the circuit associated with said device, and means engageable exteriorly of said housing but extending into said recessed cover for causing release of said means mounted in said recessed cover when manually operated, said circuit interrupter being so constructed and arranged that said contacts may be reclosed to reestablish an electric circuit therethrough.

19. In an electric switching device the combination of a housing and a recessed cover for closing an open side of said housing, a circuit interrupter mounted on said recessed cover comprising a pair of relatively movable contacts, bimetallic means mounted in said recessed cover for initiating relative separation of said contacts to interrupt the circuit associated with said device, and a spring biased member engageable exteriorly of said housing but extending into said recessed cover for release of said bimetallic means when manually operated, said circuit interrupter being so constructed and arranged that said contacts may be reclosed to reestablish an electric circuit therethrough.

20. A cut-out construction comprising a tube having an open end, a conductor within said tube and having a portion projecting outwardly from the open end of said tube, a pair of stationary contacts normally electrically connected by said conductor, retracting means within said tube tending to draw said conductor into said tube, restraining means adjacent the open end of said tube for detachably holding the outwardly projecting portion of said conductor, and manually operable means for causing release of said conductor from said restraining means, whereby electrical connection between said stationary contacts will be interrupted within said tube.

21. A drop-out cut-out construction comprising a tube having an open end, a conductor within said tube having a portion projecting outwardly from the open end of said tube, a pair of stationary contacts normally electrically connected by said conductor, retracting means within said tube tending to draw said conductor into said tube, means supporting said tube for drop-out motion, said tube being biased towards drop-out motion, restrainnig means detachably restraining said conductor and restraining said tube against drop-out motion and when released from said conductor allowing said tube to execute drop-out motion, and manually operable means for causing release of said conductor from said restraining means, whereby electrical connection between said stationary contacts will be interrupted within said tube and said tube will execute drop-out motion.

22. A cut-out construction comprising a tube having an open end and a closed end, a conductor within said tube having a normally projecting portion projecting outwardly from the open end of said tube, said tube having a terminal adjacent its closed end and having a terminal provided with a portion adjacent its open end, a pair of stationary contacts normally electrically connected to the terminals of said tube, retracting means within said tube tending to draw the normally projecting portion of said conductor into said tube, restraining means adjacent the open end of said tube for detachably holding the normally outwardly projecting portion of said conductor, and operable means for causing release of said conductor from said restraining means, the said portion of the terminal of the tube adjacent the open end being arranged in close proximity to said normally outwardly projecting portion whereby when said normally outwardly projecting portion is retracted the arc will be established between the last mentioned terminal of the tube and the normally projecting portion of said conductor and the circuit will be interrupted within said tube.

23. A cut-out construction comprising a tube having an open end, a conductor within said tube and having a portion projecting outwardly from the open end of said tube, a pair of stationary contacts normally electrically connected by said conductor, retracting means within said tube tending to draw said conductor into said tube, restraining means adjacent the open end of said tube for detachably holding the outwardly projecting portion of said conductor, and means for causing release of said conductor from said restraining means, whereby electrical connection between said stationary contacts will be interrupted within said tube.

24. A drop-out cut-out construction comprising a tube having an open end, a conductor within said tube having a portion projecting outwardly from the open end of said tube, a pair of stationary contacts normally electrically connected by said conductor, retracting means within said tube tending to draw said conductor into said tube, means supporting said tube for drop-out motion, said tube being biased towards drop-out motion, restraining means detachably restraining said conductor and restraining said tube against drop-out motion and when released from said conductor allowing said tube to execute drop-out motion, and means for causing release of said conductor from said restraining means, whereby electrical connection between said stationary contacts will be interrupted within said tube and said tube will execute drop-out motion.

SIDNEY R. SMITH, JR.